United States Patent [19]

Foley et al.

[11] 3,932,686

[45] Jan. 13, 1976

[54] BINDER COMPOSITION

[75] Inventors: Kevin M. Foley, Hebron; Frank P. McCombs, Granville, both of Ohio

[73] Assignee: Owens-Corning Fiberglas Corporation, Toledo, Ohio

[22] Filed: Nov. 13, 1974

[21] Appl. No.: 523,386

[52] U.S. Cl. ............ 428/268; 260/25; 260/29.3; 260/38; 428/273; 428/288; 428/391; 428/429
[51] Int. Cl.² ............................................ B32B 5/16
[58] Field of Search .......... 428/228, 265, 266, 268, 428/273, 288, 447, 391, 429; 260/29.3, 25, 38

[56] References Cited
UNITED STATES PATENTS

| 3,244,580 | 4/1966 | Stalego | 428/268 |
| 3,562,081 | 2/1971 | Stalego | 260/29.3 |
| 3,616,181 | 10/1971 | Stalego | 260/29.3 |

*Primary Examiner*—George F. Lesmes
*Assistant Examiner*—James J. Bell
*Attorney, Agent, or Firm*—Carl G. Staelin; John W. Overman; Patrick P. Pacella

[57] ABSTRACT

A binder composition for use in the manufacture of wool-like and board-like masses of intermeshed, randomly oriented vitreous fibers comprising a thermo setting phenolic resin and an organo silicon component in the form of a metal salt of an organo silane.

9 Claims, No Drawings

BINDER COMPOSITION

This invention relates to masses formed of randomly oriented glass fiber and a binder, and more particularly to an improved binder composition for use in the manufacture of such masses.

The production of wool-like and board-like masses formed of intermeshed, randomly oriented glass and other vitreous fibers is now well-known to those skilled in the art. Such masses are frequently used for insulation against heat and/or sound in a variety of applications including home appliance (e.g., stoves, refrigerators, etc.), automobiles and the like.

Such wool-like masses of fibers are most frequently produced by drawing streams of molten glass through small-diameter orifices, alternating the streams to provide the desired fiber diameter or average diameter, projecting the resulting fibers along with a suitable binder composition onto a foraminous conveyor and subjecting the collected fibers to curing to cause hardening of the binder composition. The resulting mass is formed of hundreds of randomly oriented, intermeshed fibers which are interbonded to one another at their points of intersection by means of the hardened or cured binder.

Board-like masses are produced in a silimar manner except that the final curing operation is carried out while the mass of fibers is compressed into the desired shape whereby the binder is cured or hardened with the fibers interbonded in a densified mass.

Phenolic resins have been used as the binder in the manufacture of such masses for a number of years. Such resins are generally heat-hardenable phenolformaldehyde resins. As is described in U.S. Pat. No. 3,244,580, such phenolic resins are frequently employed in combination with a pinewood pitch extract and more recently with a tall oil pitch and an organo silane to improve the flow characteristics of the phenolic resin on application to the glass fibers to insure bonding between the randomly oriented fibers at their points of contact.

While the use of, for example, tall oil pitch with an organo silane is quite effective in providing a phenolic resin composition having the desired flow characteristics, there is nevertheless room for further improvement in establishing a secure bonding relationship among the randomly oriented glass fibers forming wool-like and board-like masses of intermeshed fibers. It has been found that such masses formed of intermeshed fibers are only weakly bonded each to the other, with the result that the masses have low pack strength and relatively high dust levels in handling and high odor levels when used in high temperature insulation applications.

It is accordingly an object of this present invention to provide an improved phenolic resin binder composition for use in the manufacture of wool-like and board-like masses of inter-meshed glass and vitreous fibers which overcomes the foregoing disadvantages.

It is a more specific object of the invention to provide a phenolic resin binder composition for use in the manufacture of intermeshed and interbonded randomly oriented glass and other vitreous fibers having high pack strengths, low dust levels and low odor levels.

It is a related object of the invention to produce and to provide a method for producing masses to intermeshed and interbonded randomly oriented glass and other vitreous fibers having high pack strengths, low dust and low odor levels.

The concepts of the present invention resides in an improved phenolic binder composition which is formulated of an aqueous dispersion of a phenolic resin and an organo silane in the form of its metal salt. It has been found that the use of such salts provides a significant yet unexpected increase in the bonding strength of the intermeshed glass fibers.

In the preferred practice of this invention, the metal salts employed are the alkali metal (e.g., sodium, potassium) or the alkaline earth metal salts of an amino silane triol. Such salts have the formula

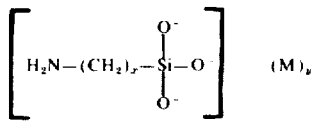

wherein M is the metal, $y$ is equal to the valence of the metal divided by 3, usually 1 or 1.5, and $x$ is an integer from 3 to 6. Also contemplated are salts dervied from polyamino silanes such as

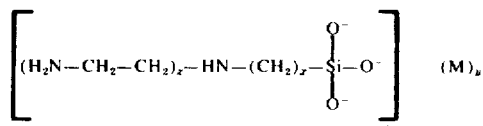

where $z$ is an integer from 1 to 3. Most preferred are the alkali metal salts.

Such silanolates can be prepared in a known manner by reaction of the corresponding amino silane with a hydroxide of the desired metal. The alcohol formed can then be removed, as by distillation.

Phenolic resins for use of the present invention include any of the heat-hardenable phenolic resin binders conventionally used to interbond randomly oriented fibers to form wool-like and board-like masses. Preferred resins are phenol-formaldehyde resins of the type described in U.S. Pat. No. 3,244,580; as described in this patent, such resins are prepared by reaction of phenol with an aldehyde such as formaldehyde, acetaldehyde or propionaldehyde alone or also in the presence of an amine-containing compound such as urea, melamine, dicyandiamide urea borate or guanidine. The amine-containing compound may either be present when the phenolic resin is prepared, or it may be added after prepared, or it may be added after preparation of the resin.

The relative proportions of the resin and the amino silanolate are not critical to the practice of the invention. The composition is usually in the form of an aqueous dispersion of the resin having a solids content of 0.1 to 25% by weight; the organo silicon compound preferably constitutes from 0.01 to 30% by weight, and most preferably 0.1 to 20% by weight, of the total weight of the resin.

Various other minor additives may also be formulated into the binder composition of this invention, including buffers (e.g., ammonium hydroxide and ammonium sulfate), emulsifiers, etc.

The composition of this invention is also preferably but not necessarily formulated to contain a cure-controlling component. Preferred are tall oil pitches and/or pinewood pitch extracts which are described in detail in U.S. Pat. No. 3,244,580, the disclosure of which is incorporated herein by reference. The cure-controlling component generally is present in an amount of 5 to 100% by weight of the total weight of the phenolic resin.

Having described the basic concepts of the invention, reference is now made to the following examples, which are provided by way of illustration but not of limitation, of the practice of the invention in the formulation of binder compositions and their use in the treatment of vitreous fibers.

EXAMPLE 1

The potassium salt of gamma-aminopropyltriethoxy silane is prepared by placing 297.2 g of KOH in a 1-liter flask, to which there is added 315 ml of water. There is then added to the resulting mixture 355.5 ml of gamma-aminopropyltriethoxy silane.

The resulting mixture is then subjected to distillation; 228.7 g of the ethanol-water azeotrope (boiling at 77° to 78°C) was removed along with a material boiling within 78° to 98°C. Remaining in the flask is 709.8 g of the silanolate $$H_2N-(CH_2)_3-Si(OK)_3$$

This silanolate is then formulated into the following binder composition:

| | Parts by weight |
|---|---|
| Phenolic resin (48% solids) | 29.9 |
| Urea | 3.6 |
| Cataphote spheres | 582 |
| Ammonium sulfate | 1.8 |
| Sodium hexametaphosphate | 0.18 |
| Potassium silanolate (10% solution) | 0.18 |
| Water | 9.36 |

The binder composition is applied to glass beads by admixing the binder composition with the glass beads (3-4% solids in glass), and then the resulting composite is molded into a shape having the configuration of a "dogbone". The "dogbones" are tested by subjecting them to fracture on a standard tensile testing machine as a measure of the adhesion between the glass and the binder composition.

The same binder composition is again formulated with (1) no organo silicon compound and (2) the standard amino silane (A-1104), and subjected to the same tests as described. The "dogbones" prepared with each of the binder compositions are cured at 450°F for 7 minutes.

The results of these tests are shown in the following table.

| Silicon compound | Dry strength | Wet strength | % retention |
|---|---|---|---|
| K silanolate | 656.4 psi | 294.0 psi | 45% |
| A-1104 | 577.2 psi | 327.6 psi | 57% |
| None | 556.7 psi | 0 psi | 0% |

The wet strength refers to the strength of the "dogbones" after storage for 18 hours at 110°F and 100% relative humidity.

The foregoing test data demonstrate that the use of the silanolate salt provides a high dry strength as compared to an amino silane.

EXAMPLE 2

The binder composition described in Example 1 containing the potassium silanolate is applied to randomly oriented glass fibers in a conventional manner to interbond the glass fibers each to the other; the wool-like mass is cured at 450°F for 5 minutes.

The mass is found to have good physical properties.

EXAMPLE 3

A phenolic resin is prepared by reacting 180 parts by weight of a 37% aqueous solution of formaldehyde with 100 parts by weight of phenol in the presence of 4 parts by weight of sodium hydroxide. The reaction mixture is allowed to stand at room temperature for about 16 hours, and is then heated until the temperature reached 85°C. The reaction mixture is then neutralized with phosphoric acid, and the resin is filtered.

The resin is then formulated into the following binder composition:

| | Parts by weight |
|---|---|
| Phenolic resin | 100 |
| Tall oil pitch with flash point of 530°F. | 80 |
| Potassium silanolate | 0.2 |
| Water to solids content of 3% | |

The resulting binder composition is applied to randomly oriented glass fibers in a conventional manner to interbond the glass fibers each to the other, and the resulting wool-like mass is cured at 400°F. for 1.3 minutes. The mass is found to have good physical properties.

The amount of binder composition applied to vitreous fibers in the manufacture of wool-like and board-like masses is not critical to the practice of the invention. For best results, it is frequently desirable to employ the binder composition in an amount sufficient to deposit on the fibers dry solids constituting from 5 to 20% by weight.

EXAMPLE 4

A phenolic resin is prepared by reacting 58 parts by weight of phenol with 123.4 parts by weight of 37% by weight aqueous formaldehyde in the presence of 12 parts by weight of barium monohydrate. The reaction mixture is first heated to 110°F. for 3 hours, then to 120°F. for 5 hours and finally to 140°F. for 2 hours.

The reaction mixture is then cooled to 100°F., and neutralized to a pH of 7.5 with sulfuric acid. A charge of 23.2 parts by weight of melamine is then added, and the reaction mixture is heated to 140°F. for 2 hours. The reaction mixture is then cooled and neutralized with additional sulfuric acid to a pH of about 7.2.

Using the procedure described in Example 1, sodium hydroxide is reacted with delta-aminobutyltrimethoxy silane to form $$H_2N-(CH_2)_4-Si(ONa)_3$$

A binder composition is formulated with the phenolic resin as follows:

| | Parts by weight |
|---|---|
| Phenolic resin | 100 |
| Sodium silanolate | 0.6 |
| Tall oil pitch | 54.0 |
| Water to solids content of 5% | |

The resulting composition is then applied to intermeshed glass fibers as described in Example 2 to form masses of wool-like fibers. Comparable results are obtained.

EXAMPLE 5

Using the procedure described in Example 1, N-aminoethyl-gamma-aminopropyltriethoxy silane is reacted with KOH to form the silanolate:

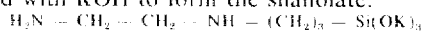

This silanolate is formulated with the phenolic resin of Example 3 to form the following binder composition:

|  | Parts by weight |
|---|---|
| Phenolic resin | 100.0 |
| Silanolate | 10.0 |
| Water to solids of 8% | |

EXAMPLE 6

Using the procedure described in Example 1, MgO is reacted in the presence of water with gamma-aminopropyltriethoxy silane to form the silanolate

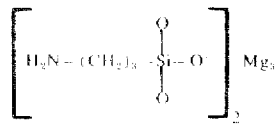

The silanolate is formulated into the following binder composition:

|  | Parts by weight |
|---|---|
| Phenolic resin | 30.0 |
| Ammonium sulfate | 2.0 |
| Silanolate | 0.3 |
| Water | 10.0 |

Each of the binder compositions of Examples 4 to 6 can be used in the same manner as described in Examples 1 to 3 in the manufacture of wool-like and board-like masses of fibers. The organo silicon compounds of the invention provides a secure bond between the fibers forming such masses to assure maximum strength and minimum dust and odor levels.

It will be understood that various changes can be made in the details of procedure, formula and use without departing from the spirit of the invention, especially as defined in the following claims.

We claim:

1. A mass of intermeshed vitreous fibers bonded to one another at points of contact by a thermoset phenolic resin binder which is the product of heat curing of a composition containing a phenolic resin and a silanolate salt selected from the group consisting of a salt of the formula

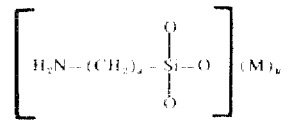

and a salt of the formula

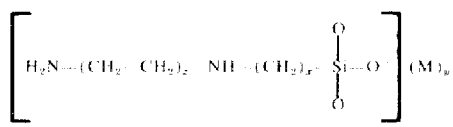

where M is a metal having a valence of up to 2, $y$ is equal to 3 divided by the valence of the metal, $x$ is an integer from 3 to 6 and $z$ is an integer from 1 to 3.

2. A mass as defined in claim 1 wherein the fibers are glass fibers.

3. A mass as defined in claim 1 which includes a cure controlling component for the phenolic resin.

4. A mass as defined in claim 3 wherein the cure controlling component is selected from the group consisting of a tall oil pitch, a pinewood pitch extract and mixtures thereof.

5. A mass as defined in claim 1 wherein the resin is a resin prepared by reaction of an aldehyde selected from the group consisting of formaldehyde, acetaldehyde and propionaldehyde.

6. A mass as defined in claim 5 wherein the binder is prepared with an amine compound selected from the group consisting of urea, melamine, dicyandiamide urea borate and quanidine.

7. A composition as defined in claim 1 wherein M is selected from the group consisting of alkali metals and alkaline earth metals.

8. A composition as defined in claim 1 wherein M is an alkali metal.

9. A composition as defined in claim 1 wherein the silanolate has the formula

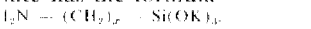

* * * * *